United States Patent
Bornemann et al.

(10) Patent No.: US 12,403,430 B2
(45) Date of Patent: Sep. 2, 2025

(54) SINGLE-SCREW EXTRUDER

(71) Applicant: battenfeld-cincinnati germany gmbh, Bad Oeynhausen (DE)

(72) Inventors: Markus Bornemann, Paderborn (DE); Juergen Huegelmeyer, Osnabrueck (DE)

(73) Assignee: BATTENFELD-CINCINNATI GERMANY GMBH, Bad Oeynhausen (DE)

( * ) Notice: Subject to any disclaimer, the term of this patent is extended or adjusted under 35 U.S.C. 154(b) by 772 days.

(21) Appl. No.: 17/793,682

(22) PCT Filed: Nov. 1, 2020

(86) PCT No.: PCT/EP2020/080614
§ 371 (c)(1),
(2) Date: Jul. 19, 2022

(87) PCT Pub. No.: WO2021/089444
PCT Pub. Date: May 14, 2021

(65) Prior Publication Data
US 2023/0046870 A1    Feb. 16, 2023

(30) Foreign Application Priority Data
Nov. 5, 2019  (DE) .................. 10 2019 129 717.6

(51) Int. Cl.
*B01F 27/00* (2022.01)
*B01F 23/40* (2022.01)
(Continued)

(52) U.S. Cl.
CPC .......... *B01F 27/1143* (2022.01); *B01F 23/43* (2022.01); *B01F 23/47* (2022.01);
(Continued)

(58) Field of Classification Search
CPC ....... B01F 27/1143; B01F 23/47; B29C 48/65
See application file for complete search history.

(56) References Cited

U.S. PATENT DOCUMENTS 3,358,327 A    12/1967  Maillefer
3,698,541 A  * 10/1972  Barr .................. B29C 48/65
                                                 425/208
(Continued)

FOREIGN PATENT DOCUMENTS

DE    1207074 B    12/1965
DE    2818975 A1   11/1978
(Continued)

*Primary Examiner* — Anshu Bhatia
(74) *Attorney, Agent, or Firm* — LEYDIG, VOIT & MAYER, LTD.

(57) ABSTRACT

A single-screw extruder for conveying and plasticizing a meltable material, including a screw and a heated cylinder, wherein the screw is rotatably held in the heated cylinder, the screw has a core and a helical main flight, which is at a first distance from the internal wall of the cylinder, a region of a transition zone and a melting zone has at least two successive, non-overlapping barrier portions, and a cylinder-side outside flight surface of one or more overflow flights is chamfered in full or in part over a flight width such that a conical gap that gets narrower in an overflow direction is formed between the internal wall of the cylinder and the cylinder-side outside flight surface.

11 Claims, 4 Drawing Sheets

(51) Int. Cl.
*B01F 23/43* (2022.01)
*B01F 23/47* (2022.01)
*B01F 27/1143* (2022.01)
*B01F 27/191* (2022.01)
*B01F 27/724* (2022.01)
*B01F 35/92* (2022.01)
*B01F 35/90* (2022.01)
*B01F 101/00* (2022.01)

(52) U.S. Cl.
CPC .......... *B01F 23/482* (2022.01); *B01F 27/191* (2022.01); *B01F 27/724* (2022.01); *B01F 35/92* (2022.01); B01F 2035/99 (2022.01); B01F 2101/2805 (2022.01)

(56) References Cited

U.S. PATENT DOCUMENTS

| | | | |
|---|---|---|---|
| 4,128,341 A | 12/1978 | Hsu | |
| 6,672,753 B1 | 1/2004 | Womer et al. | |
| 2004/0141406 A1* | 7/2004 | Womer | B29C 48/53 |
| | | | 366/89 |
| 2010/0310693 A1* | 12/2010 | Klee | B29C 48/65 |
| | | | 425/113 |

FOREIGN PATENT DOCUMENTS

| | | |
|---|---|---|
| DE | 10130759 A1 | 9/2002 |
| DE | 19928870 C2 | 10/2003 |
| DE | 10253225 B4 | 5/2007 |
| DE | 102006011068 A1 | 9/2007 |

* cited by examiner

SINGLE-SCREW EXTRUDER

CROSS REFERENCE TO RELATED APPLICATIONS

This application is a U.S. National Phase application under 35 U.S.C. § 371 of International Application No. PCT/EP2020/080614, filed on Nov. 1, 2020, and claims benefit to German Patent Application No. DE 10 2019 129 717.6, filed on Nov. 5, 2019. The International Application was published in German on May 14, 2021 as WO 2021/089444 A1 under PCT Article 21(2).

FIELD

The invention relates to a single-screw extruder for conveying and plasticizing a meltable material.

BACKGROUND

Single-screw extruders have long been known in the prior art. For economic reasons, the crucial process-related variable is often the mass throughput that can be obtained. For an identical machine size and process duration, said throughput is highly dependent on the plasticizing performance of the screw geometry used. Originally, relatively simple screw geometries were used. These include, for example, the three-zone screw, which has an infeed zone, a compression zone, and a melt conveying zone. In this case, a channel depth compression is arranged in the region of the melting. In this way, the material being melted from the so-called solids bed is brought into heat-conducting contact with the temperature-controlled cylinder wall, and the resulting melt is displaced into the melt-filled region of the screw duct. This operation is particularly effective when the melt film that forms in the process between the solids and the cylinder is kept as thin as possible so that it has no insulating effect on the transfer of heat into the solids bed.

To increase the plasticizing performance of the screw without changing the melt temperature, there were numerous approaches or concepts in the past; these can be roughly categorized into those that separate the solids and the melt afterwards and those that break up the compacted solids and mix the smallest possible solids particles in the already-formed melt.

The barrier screw is one of the most well-known separating concepts and is used in both smooth-barrel and grooved-barrel extruders. This concept can be attributed to German patent DE 1207074 B, among others. That patent discloses a screw press for processing thermoplastics by conveying, plasticizing, and masticating, followed by extrusion through an ejection opening. The screw press is equipped with a screw that has a single thread in parts and two threads in parts, there being a flow gap between the screw flight periphery of said screw and the inner wall of the screw cylinder, and the material reaching the ejection opening via the screw tip in its viscous end phase, the screw flight of the second screw thread beginning at the point at which the material reaches its viscous end phase in the flow gap, and the flow cross section of one groove between the adjacent screw flights of the two screw threads increasing from said point onward in the conveying direction from zero to a maximum value at the front end of the screw whereas the flow cross section of the other groove (the only groove in the region of the feed opening) decreases from the relevant site onward in the conveying direction from the maximum value to zero at the front end of the screw.

This is the original concept of the barrier screw, with the screw duct split in the region of the melting zone into a solids duct, in which the actual melting process takes place, and a melt duct, which holds only molten material owing to the size of the gap from the barrier flight to the internal wall of the cylinder. To not impair the conveyance capacity of the screw, the length of the barrier has to be selected such that the melting is complete at the latest at the end of the barrier. Due to the continuously decreasing cross section of the solids duct, the solids are guided in the form of a compressed solids bed, and the solids bed need not be broken up, which may take place, for example, in a conventional three-zone screw without barriers and impedes the melting. In addition, the filter effect of the barrier screw caused by the gap prevents relatively large solids particles or agglomerates from being able to reach the end of the screw via the gap. In barrier screws, the energy for melting is input into the solids in the same way as in three-zone screws, predominantly by the solids bed being in heat-conducting contact with the heated cylinder.

Although the barrier flight has a very efficient blocking action against unmelted solids, in some cases the solids may travel over the barrier flight. This happens, for example, if the melting capacity of the barrier is exceeded when using grooved-barrel extruders having high conveyance and pressure-building capacity. In this case, even when the size of the barrier gap is smaller than the particle size of the solid starting material to be melted, a certain solids fraction that has been deformed or already softened by the influence of pressure and temperature may pass over the barrier. This effect unfavorably occurs mostly at the end of the barrier, meaning that in some cases the solids may no longer be completely melted by the end of the screw. In addition, this is generally material from the core of the compacted solids bed that cannot be adequately heated over the course of the barrier owing to the comparatively poor heat-conduction properties of the material to be melted.

U.S. Pat. No. 4,128,341 describes an approach for enhancing the range of processing parameters in barrier screws through a more universal plasticizing concept. This patent discloses an extruder screw having an infeed region, a melting region, and a melt conveying region comprising at least three spiral-shaped ducts, which overlap in part in a double-thread region and are separated from one another by overflow flights having different gap widths in relation to the cylinder. In this case, the first duct (the solids duct) reaches as far as into the melting region of the screw. The second duct, in which solids and melt are present concurrently with one another, extends from the beginning to the end of the melting region, and the melt duct, which is open at the end, extends from the beginning of the melt conveying region as far as to the end of the screw. In this case, the gap width of the first overflow flight in relation to the cylinder also allows solids to overflow, but only melt can flow over the second overflow flight, which has a smaller gap width.

Another approach for enhancing the melting and throughput performance in barrier screws is set out in patent specification DE 19928870 C2. This patent discloses a single-screw extruder comprising a barrier screw, which has at least one barrier flight, and a cylinder, in which the barrier screw is rotatably held and which has at least one infeed zone longitudinal portion, characterized in that, on its inner wall in the region of the barrier flight, the cylinder has at least one groove extending in the longitudinal direction. Owing to this combination of barrier screw and cylinder, which has at least one groove in the melting zone, the solids get caught in the groove, so small portions thereof reach the melt duct along a single barrier portion. Here, said solids can then be melted again through the conduction of heat. In this way, the stress on the solids duct is relieved and the melting operation is simultaneously improved due to the increase in the heat-transmitting surface area of the cylinder. However, the prerequisite for this is that the barrier gap of the one single-thread or multi-thread barrier is selected to be small enough to prevent excessively high volumes of solids from crossing over into the melt duct and so as not to exceed the relatively low melting capacity thereof.

A typical example of melting concepts based on mixing solids and melt are so-called polygonal screw concepts. By way of example, the motivation behind DE 10253225 B4 is to enhance the throughput performance of screws of this kind. This patent discloses a single-screw extruder having a plurality of overflow flights that overlap in the axial direction and are offset accordingly from the main flight. As a result, solids are able to cross over comparatively long barrier flights multiple times while the extruder still has a short construction length and suitably good mixing properties.

SUMMARY

In an embodiment, the present disclosure provides a single-screw extruder for conveying and plasticizing a meltable material, comprising a screw and a heated cylinder, wherein the screw is rotatably held in the heated cylinder, the screw has a core and a helical main flight, which is at a first distance from the internal wall of the cylinder and forms a screw duct together with the cylinder and the core of the screw, the screw comprises a solids conveying zone, a transition zone, a melting zone, and a melt conveying zone in accordance with changing states of matter of the meltable material, the first distance from the main flight to the internal wall of the cylinder in a region of the transition zone and the melting zone is configured such that melt is prevented from running over the main flight, the region of the transition zone and the melting zone has at least two successive, non-overlapping barrier portions, an overflow flight is arranged in each barrier portion, the overflow flights beginning from an active flank of the main flight, the active flank being defined by rotation of the screw, and ending at a passive flank of the main flight, the overflow flights thereby configured to provide at least three separate ducts, the at least three separate ducts being interconnected merely by a gap formed as a result of a second distance from the overflow flight to the internal wall of the cylinder, the second distance from the overflow flights to the internal wall of the cylinder in each barrier portion is greater than the first distance from the main flight to the internal wall in order to allow solids and/or melt to cross over, at least in a region of the first barrier portion, the internal wall of the cylinder is provided at least in part with either at least one cylinder groove extending in parallel with a longitudinal axis of the screw or a helically extending cylinder groove, and a cylinder-side outside flight surface of one or more overflow flights is chamfered in full or in part over a flight width such that a conical gap that gets narrower in an overflow direction is formed between the internal wall of the cylinder and the cylinder-side outside flight surface.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
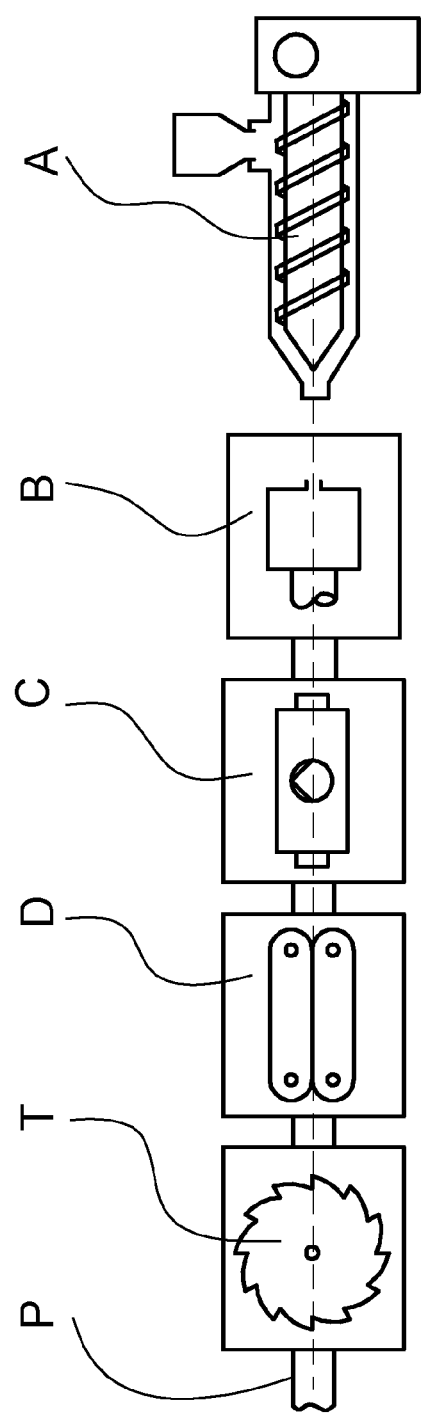
FIG. 1 shows an extrusion line.

In an embodiment, the present invention provides a single-screw extruder comprising an extruder screw in such a way as to allow for more effective melting compared with the prior art, and to disclose a related method, where "more effective melting" means, for example, greater plasticizing performance, and thus ejection performance, while otherwise having the same boundary conditions in terms of structure and process.

In an embodiment, a region from the transition zone to the melting zone has at least two successive, non-overlapping barrier portions, in that an overflow flight is present in the course of each barrier portion, said overflow flight beginning from the active flank of the main flight, which active flank is defined by the screw rotation, and ending at the passive flank of the main flight, thereby forming at least three separate ducts, which are interconnected merely by the gap formed as a result of a distance from the overflow flight to the internal wall of the cylinder, in that the distances from the overflow flights to the internal wall of the cylinder in each barrier portion are greater than the distance from the main flight to the internal wall in order to allow solids and/or melt to cross over, and in that, at least in the region of the first barrier portion, the internal wall of the cylinder is provided at least in part with either at least one cylinder groove extending in parallel with the longitudinal axis of the screw or a helically extending cylinder groove.

Since, according to an embodiment of the invention, the material being melted is conveyed over at least two separate, non-overlapping overflow flights, the overall plasticizing operation runs in multiple stages, with the material no longer being fully plasticized within one single "long" barrier zone but rather being plasticized incrementally in a plurality of successive barrier zones until the melting is finally complete to the desired degree of melting within the last barrier zone. Accordingly, selecting the distances from the overflow flights to the internal wall of the cylinder fundamentally allows solids to flow over said flights. This applies in particular to the first barrier zone, in which a high solids fraction is intended to pass over the barrier owing to the selection of a comparatively large barrier gap. In this way, the solids bed is already broken up at an early stage and reaches the next screw duct in "pre-heated" form owing to the stress as it runs over the barrier flight. When using a "smooth" cylinder wall, this operation would entail considerable pressure requirements and, in the event that the pressure-building capacity of the upstream screw zones were exceeded, it would also lead to a drop in the ejection performance of the screw. In addition, owing to the high pressure prevailing in this region, the material would be unnecessarily stressed and the temperature of the melt produced would be disadvantageously increased. Owing to the grooving in the cylinder wall in this region, as provided in the invention, the solids are actively conveyed in both the solids duct and the barrier gap between the barrier flight and the cylinder wall, thereby keeping the process pressure and the stress on the material low. In addition, solids can uniformly cross over the barrier over its entire length within the first barrier portion, thus ensuring that the solids are dispersed very well in the melt in the next duct.

Owing to the lack of overlap between the barrier flights in accordance with the invention, sufficient distance is ensured from the first duct end, in which a compacted solids bed is still present, to the screw tip, and it is also guaranteed that there is an adequate dwell time for further mixing and the further disperse melting of the solids particles before the solids-melt mixture crosses over the next barrier flight. In this case too, the cylinder grooves provided according to the invention have an advantageous effect in terms of conveyance, even if the pressure is not reduced quite as much in the subsequent portions as in the first portion.

According to an embodiment, it is proposed that the distance from the last overflow flight to the internal wall of the cylinder is selected such that only melt may be conveyed over the last overflow flight. As a result, it is ensured that the material is fully melted within the last barrier portion.

Advantageously, the barrier portion or portions downstream of the first barrier portion directly succeed one another, which inevitably leads to the melting effects being maximized without changing the length of the transition zone and melting zone. The available screw length can thus be used optimally for melting the material.

Furthermore, in some embodiments the distances from the overflow flights downstream of the first overflow flight to the internal wall of the cylinder continuously become smaller in order to further reduce the size of the remaining solids agglomerates or particles and also to ensure the effectiveness of the melting effects. Equally, it is expedient for the downstream barrier portion or portions to continuously become shorter up to the last one in order to deal with the solids fraction, which gets smaller over the course of the transition zone and melting zone.

According to an embodiment, it is proposed that the cylinder-side flight surface of one or more overflow flights is chamfered either in full or in part over the flight width. The overflow flight may also have chamfered portions in the axial direction of each barrier portion. In this way, a narrowing conical gap is formed between the overflow flight and the internal wall of the cylinder in the overflow direction of the material, which makes it simpler for the solids-melt mixture to run into the gap. In addition, this also leads to greater elongation effects, which additionally help reduce the size of the softened solids and thus contribute to gentle melting.

The distance to the internal wall of the cylinder may also be changed within one or more barrier portions in the axial direction of the screw either continuously or within a plurality of steps, which also includes forming narrow slits, or the flight width of the overflow flight may be varied within one or more barrier portions either continuously or within a plurality of steps. As a result, both the shear energy input into the solids-melt mixture within a barrier portion and the above-described elongation effects can be controlled very flexibly, and thus so too can the melting over the length of the screw. In addition to the number of barrier portions, the melting process can thus be adapted in particular for different materials.

The progression of the melting over the length of the screw can be controlled even more flexibly if the screw has a plurality of parallel main flights or if the number of main flights varies from one barrier portion to the next, since an increasing number of main flights, and thus also an increasing number of overflow flights, influences the intensity of the melting operations. For example, if there were two main flights, there would also be two overflow flights within one barrier portion, each overflow flight beginning at the active flank of one main flight and ending at the passive flank of the other main flight. In relation to the number of main flights, it is generally recommended not to select this to be too high, since in the case of a high number of main flights, for example in a shear component commonly used at the end of the screw, too much shear would be input into the material being melted.

The single-screw extruder according to the invention is particularly advantageous if the inner wall in the region of the infeed zone or solids conveying zone is additionally provided with a groove that either extends in parallel with the longitudinal axis or is helical. In this way, the pressure required for passing over a plurality of overflow flights can be built up, so stable conveyance can be ensured in combination with an accordingly high throughput. It goes without saying that the grooves in the region of the infeed zone or solids conveying zone may proceed continuously as far as into the barrier portions.

In an embodiment, a method is characterized in that the meltable material has to successively pass over at least two separate overflow flights in the transition zone and the melting zone. In this way, the material as a whole comes into direct heat-conducting contact with the heated internal wall of the cylinder multiple times, thereby increasing the effectiveness of the entire melting process because this intensifies the conduction of heat into the insulating plastics material.

In addition, once the material has flowed over the first overflow flight, partly molten material is present at the end of the first barrier portion, the melt fraction further increasing incrementally after flowing over the further overflow flights until fully molten material is present at the end of the last barrier portion. In this way, the compacted solids bed is already completely broken up at the end of the first barrier portion. This prevents fully unmelted solids from being able to reach the end of the screw, as described at the outset in relation to the standard barrier geometry, and also ensures that a mixture of solids particles and melt is present thereafter, especially also while crossing over the gap. The melt is thus cooled while overheating is prevented and the solids are additionally melted even further. Moreover, unmelted particles or agglomerates are subjected to a repeated shear event during the subsequent overflow phases, leading to comminution and thus to an increase in the heat-transmitting surface area of the solids. The melting is also assisted by elongation effects that take effect in particular in conical gaps or wide overflow flights and, as experience shows, melt the material more gently than pure shear forces.

To maximize the above-described effects, the first barrier portion should begin as early as possible, if feasible as early as in the transition zone. This zone is the zone in which the material is already heated above the solids conveying zone temperature, at least in the edge zones of the screw duct, but in which the melting point has not yet been exceeded. This zone is thus very short compared with the melting zone. However, since the pre-heated material is already softened at least in part, depending on the type, it can be readily conveyed over the first overflow flight at the start of the first barrier portion, where it is subjected to first stresses.

FIG. 1 shows a typical extrusion line, as used nowadays for profile extrusion, be it for the production of window profiles or pipes. It shows an extruder A in which plastics material is melted and continuously conveyed into the extrusion die B for shaping. Following said extruder is a calibration and cooling station C; depending on the profile, additional cooling stations may be inserted. A drawing device D follows the cooling stations. To cut the continuous profiles P to the desired length, a cutting device T is arranged thereafter.

Figure 2:
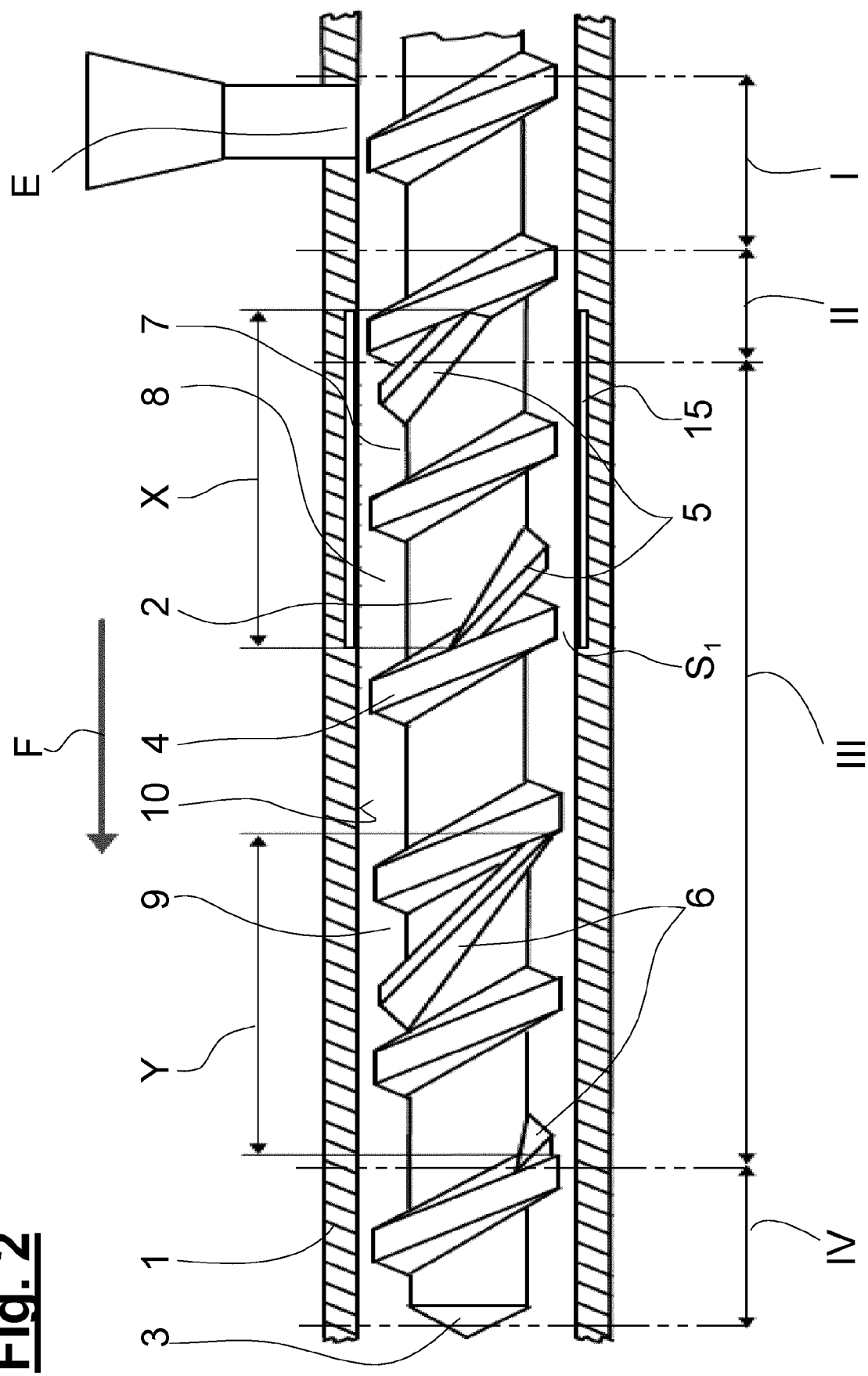
FIG. 2 shows a schematically illustrated extruder or a process unit consisting of a screw having a cylinder.

FIG. 2 schematically shows an extruder A or process unit, comprising the cylinder 1, the screw 2, which extends from the material inlet of the feed opening E to the screw tip 3 at the relevant length for the process, and the main flight 4, which is at a distance S1 from the internal wall 10 of the cylinder 1. The screw 2 is divided into four zones: The solids conveying zone I, the transition zone II, the melting zone III, and the melt conveying zone IV.

Figure 3:
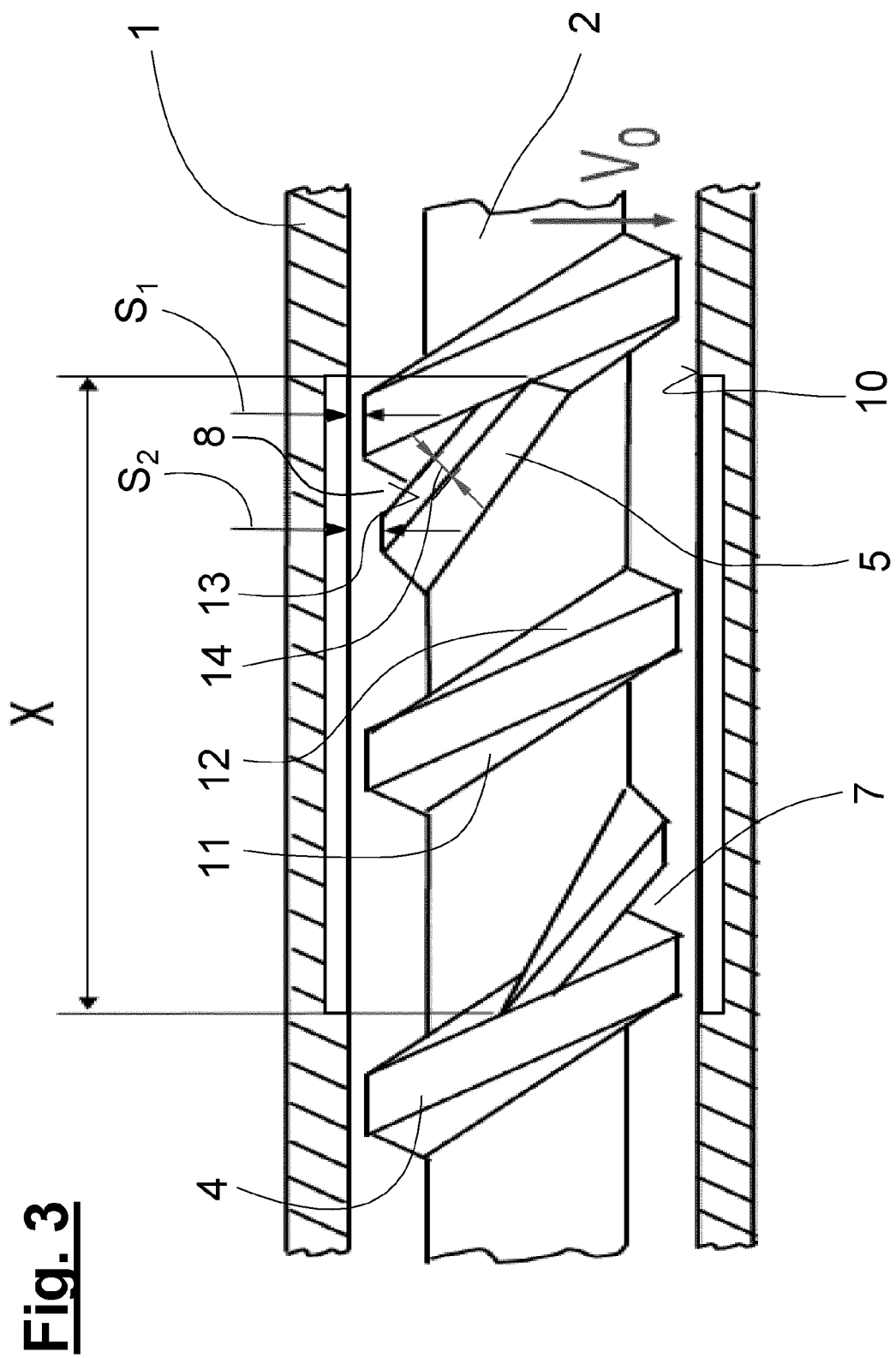
FIG. 3 shows a detailed view of the process unit of FIG. 2.

In the transition zone II and the melting zone III, two separate barrier portions X and Y are indicated by way of example, each having one overflow flight 5 and 6, respectively. In this case, the first barrier portion X already starts in the transition zone II but it could indeed not start until the melting zone. The second barrier zone Y is located at the end of the melting zone III (when viewed in the conveying direction F). In principle, two or even more barrier portions may be located in the transition zone II and melting zone III. The ranges of the barrier portions are indicated schematically using dimensional lines and projection lines. The illustration shows the principle according to the invention for the structure of the screw, so it only shows a few windings of the main flight and of the transitional flights; it goes without saying that the flight in the infeed zone, for example, does not extend only once around the core of the screw 2, as shown here schematically. The melt duct formed by the main flight 4 is divided into two ducts by the separate overflow flights 5, 6, respectively. Thus, in the first barrier portion X the ducts 7 and 8 are formed by the overflow flight 5, and in the second barrier portion Y a further duct 9 extending in parallel with 8 is formed by the overflow flight 6. FIG. 3 shows the special case in which the internal cylinder wall is grooved only in the region of the first barrier portion.

The barrier portion X is shown separately in FIG. 3. The overflow flight 5 in the first barrier portion X begins at the active flank 11 of the main flight 4 and extends toward the passive flank 12 of the main flight at a different helix angle or different thread pitch from the main flight 4. When the overflow flight has a constant pitch, the pitch is inevitably larger than that of the main flight. In principle, however, the helix angle of the overflow flight may also vary over the course of the barrier zone; for example, it may be the same as that of the main flight in one portion. Two separate ducts 8 and 9 are produced by the overflow flight. The distance S2 from the overflow flight 5 to the internal wall 10 of the cylinder 1 is different from the distance S1 from the main flight 4 to said internal wall. The distance S2 from the overflow flight 5 is configured such that melt and/or solids can cross over. Further separate barrier portions similarly follow, though this can be limited to just a second barrier portion. The configuration of the overflow flights of the two barrier portions need not be identical; for example, the helix angle, the flank geometry, or the height may differ. In parts, the outside flight surface 13, forming the distance S2, of the overflow flight 5, 6 may vary over the length of the barrier portion in the conveying direction F, for example by the flight width 14 being changed in some portions or continuously or by way of full or partial chamfering over the flight width 14. The peripheral speed of the screw is denoted by V0.

Figure 4:
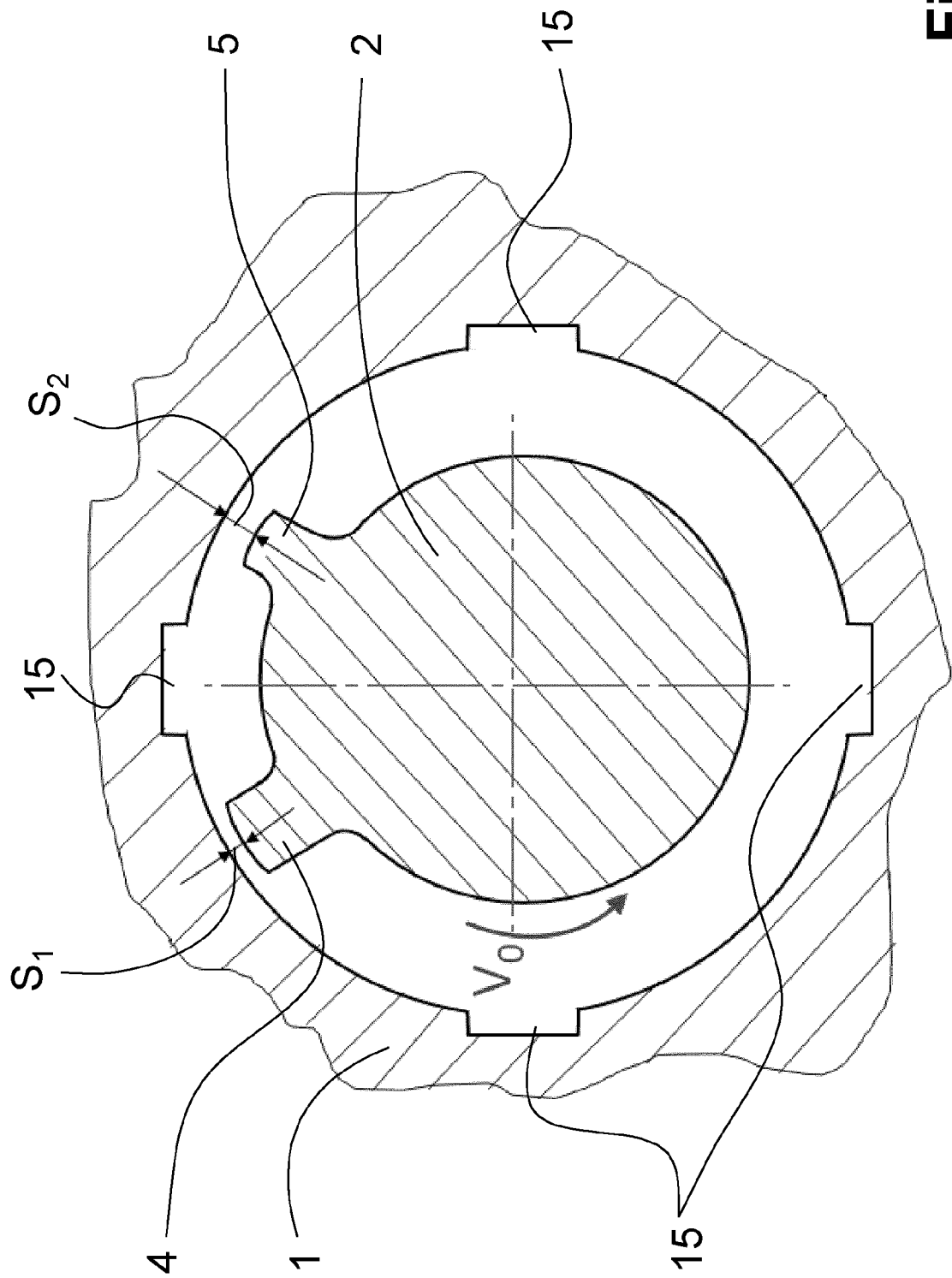
FIG. 4 is a sectional view, in the extrusion direction, of the detail of the process unit shown in FIG. 3.

FIG. 4 is a sectional view of the first barrier portion X to further illustrate the geometry and the relative movements. The cylinder 1 and the screw 2 can be seen in the section. The screw 2 rotates at the peripheral speed V0.

In the sectional view, the differences in the flights are clear. The main flight 4 is at a smaller distance S1 from the internal wall 10 of the cylinder 1 than the overflow flight 5. The distance of the overflow flight from the internal wall 10 is denoted by S2. The cylinder grooves 15 extending in parallel with the screw 1 are also clearly visible. By way of example, four of them are shown. As already described above, however, there may be fewer or more cylinder grooves, or they may even be helically extending cylinder grooves.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

A Extruder
B Extrusion die
C Calibration and cooling tank
D Drawing device
E Feed opening
F Conveying direction
P Profile
S1 Distance from 4 to 10
S2 Distance from 5 to 10
T Cutting device
I Solids conveying zone
II Transition zone
III Melting zone
IV Melt conveying zone
X First barrier portion
Y Second barrier portion
V0 Peripheral speed
1 Cylinder
2 Screw
3 Screw tip 4 Main flight
5 First overflow flight
6 Second overflow flight
7 Duct running into X
8 Duct running out of X or running into Y
9 Duct running out of Y
10 Internal wall of 1
11 Active flank of 4
12 Passive flank of 4
13 Outside flight surface of 5
14 Flight width of 5
15 Cylinder groove

The invention claimed is:

1. A single-screw extruder for conveying and plasticizing a meltable material, comprising:
a screw; and
a heated cylinder, wherein:
the screw is rotatably held in the heated cylinder,
the screw has a core and a helical main flight, wherein the helical main flight is at a first distance from an internal wall of the cylinder and forms a screw duct together with the cylinder and the core of the screw,
the screw comprises a solids conveying zone, a transition zone, a melting zone, and a melt conveying zone in accordance with changing states of matter of the meltable material,
the first distance from the main flight to the internal wall of the cylinder in a region of the transition zone and the melting zone is configured such that melt is prevented from running over the main flight,
the region of the transition zone and the melting zone has at least two successive, non-overlapping barrier portions,
an overflow flight is arranged in each barrier portion, the overflow flights beginning from an active flank of the main flight, the active flank being defined by rotation of the screw, and ending at a passive flank of the main flight, the overflow flights thereby configured to provide at least three separate ducts, the at least three separate ducts being interconnected merely by a gap formed as a result of a second distance from the overflow flight to the internal wall of the cylinder,
the second distance from the overflow flights to the internal wall of the cylinder in each barrier portion is greater than the first distance from the main flight to the internal wall in order to allow solids and/or melt to cross over,
at least in a region of the first barrier portion, the internal wall of the cylinder is provided at least in part with either at least one cylinder groove extending in parallel with a longitudinal axis of the screw or a helically extending cylinder groove, and
a cylinder-side outside flight surface of one or more overflow flights is chamfered in full or in part over a flight width such that a conical gap that gets narrower in an overflow direction is formed between the internal wall of the cylinder and the cylinder-side outside flight surface.

2. The single-screw extruder according to claim 1, wherein one of the barrier portions is a final barrier portion in which the second distance from the overflow flight to the internal wall of the cylinder is configured such that only melt is conveyed over the overflow flight.

3. The single-screw extruder according to claim 1, wherein the barrier portion or portions downstream of the first barrier portion directly succeed one another.

4. The single-screw extruder according to claim 3, wherein distances from the overflow flights downstream of the first overflow flight to the internal wall of the cylinder continuously become smaller and/or the barrier portions downstream of the first barrier portion continuously become shorter.

5. The single-screw extruder according to claim 1, wherein a width of the overflow flights and/or a distance therefrom to the internal wall of the cylinder varies, at least in part, within one or more barrier portions either continuously or in portions.

6. The single-screw extruder according to claim 1, wherein the screw has a plurality of parallel main flights.

7. The single-screw extruder according to claim 1, wherein, in a region of an infeed or solids conveying zone, the internal wall is provided at least in part with at least one further cylinder groove that either extends in parallel with the longitudinal axis of the screw or is helical and can merge into the cylinder groove of the first barrier portion.

8. A method for conveying and plasticizing a meltable material using a single-screw extruder in which a screw is rotatably held in a heated cylinder, the method comprising:
providing the screw with a core and a helical main flight, wherein the helical main flight is at a first distance from an internal wall of the cylinder and forms a screw duct together with the cylinder and the core of the screw;
providing the screw with a solids conveying zone, a transition zone, a melting zone, and a melt conveying zone in accordance with changing states of matter of the meltable material;
configuring the first distance from the main flight to the internal wall of the cylinder in a region of the transition zone and the melting zone configured such that melt is prevented from running over the main flight; and
transporting the meltable material along the screw duct from the solids conveying zone to the melt conveying zone and changing the meltable material from a solid into a paste-like melt in the process, wherein:
in the transition zone and the melting zone, in which the cylinder region is fully or partly grooved, the meltable material passes over at least two separate, non-overlapping overflow flights, and
a high solids fraction uniformly crosses over the first overflow flight over the entire length of a first barrier portion such that a solids-melt mixture is present in a subsequent duct formed downstream of the first overflow flight.

9. The method according to claim 8, wherein, once the material has flowed over the first overflow flight, partly molten material is present at an end of the first barrier portion, the melt fraction further increasing incrementally after flowing over further overflow flights until sufficiently molten material is present at an end of the last barrier portion.

10. The method according to claim 8, wherein a solids-melt mixture having the smallest possible solids particles is present in the subsequent duct formed downstream of the first overflow flight.

11. The single-screw extruder according to claim 1, wherein a number of main flights or a direction of spiral varies from one barrier portion to the next.

* * * * *